US012060102B1

(12) United States Patent
Nusier et al.

(10) Patent No.: US 12,060,102 B1
(45) Date of Patent: Aug. 13, 2024

(54) STEERING POST REINFORCEMENT FOR THREE-WHEELED VEHICLE

(71) Applicant: Ford Global Technologies, LLC, Dearborn, MI (US)

(72) Inventors: Saied Nusier, Canton, MI (US); Jamel E. Belwafa, Ann Arbor, MI (US); Srinivasan Sundararajan, Ann Arbor, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/301,446

(22) Filed: Apr. 17, 2023

(51) Int. Cl.
*B62D 1/19* (2006.01)

(52) U.S. Cl.
CPC ............. *B62D 1/195* (2013.01); *B62D 1/197* (2013.01)

(58) Field of Classification Search
CPC ........ B62K 11/14; B62D 1/195; B62D 1/197; B60R 21/05; B62J 27/30
See application file for complete search history.

(56) References Cited

U.S. PATENT DOCUMENTS

| | | | | |
|---|---|---|---|---|
| 3,578,782 | A * | 5/1971 | Miyoshi | B62D 1/197 180/232 |
| 4,728,122 | A * | 3/1988 | Wright | B60R 21/05 296/74 |
| 6,276,480 | B1 | 8/2001 | Aregger | |
| 2013/0168934 | A1* | 7/2013 | Krajekian | B62K 5/05 280/62 |

FOREIGN PATENT DOCUMENTS

| | | | |
|---|---|---|---|
| CN | 109476354 B | 2/2021 | |
| DE | 19519664 A1 * | 12/1996 | ............ B60R 21/00 |
| IN | 201941002388 A | 8/2019 | |
| KR | 100931194 B1 * | 12/2009 | |
| SE | 536376 C2 | 9/2013 | |
| WO | WO-2008081218 A1 * | 7/2008 | ............ B62D 1/197 |

OTHER PUBLICATIONS

Srikanth, K. M., et al., "Assessing the Structural Crashworthiness of a Three-Wheeler Passenger Vehicle," Proceedings of the 2nd International Conference on Research into Design, 2009, 8 pages.

* cited by examiner

*Primary Examiner* — Drew J Brown
(74) *Attorney, Agent, or Firm* — Frank A. MacKenzie; Bejin Bieneman PLC (57) ABSTRACT

A vehicle includes a frame including a first post, a second post spaced cross-vehicle from the first post, and a steering post rotatably supported by the frame. The steering post extends between the first and second posts. The vehicle includes a steering post reinforcement having a first and a second end each fixed to the frame, a curved portion curving about the axis between the ends, and a first and a second portion extending from the ends to the curved portion. The first and second portions are elongated vehicle-rearward from the frame to the curved portion. The curved portion defines an opening between the ends. The steering post extends through the opening between the curved portion and the frame and between the first and second portions. The curved portion is spaced vehicle-rearward from the steering post. The first and second portions are spaced cross-vehicle from the steering post.

20 Claims, 6 Drawing Sheets

STEERING POST REINFORCEMENT FOR THREE-WHEELED VEHICLE

BACKGROUND

Three-wheeled vehicles are lightweight, affordable vehicles used in urban transportation. Three-wheeled vehicles can be designed to accommodate a single-occupant or multiple occupants. Three-wheeled vehicles may have features that control deformation of a body and/or frame of the vehicle and/or other external components of the vehicle in the event of certain vehicle impacts, e.g., certain frontal vehicle impacts.

DETAILED DESCRIPTION

A vehicle includes a vehicle frame including a first post and a second post spaced cross-vehicle from the first post. The vehicle includes a steering post rotatably supported by the vehicle frame. The steering post extends along an axis between the first post and the second post. The vehicle includes a steering post reinforcement having a first end and a second end each fixed to the vehicle frame and a curved portion curving about the axis between the first end and the second end. The steering post reinforcement includes a first portion extending from the first end to the curved portion and a second portion extending from the second end to the curved portion. The first portion and the second portion are elongated from the vehicle frame to the curved portion in a vehicle-rearward direction of the vehicle frame. The curved portion defines an opening between the curved portion and the vehicle frame and between the first end and the second end. The steering post extends through the opening between the curved portion and the vehicle frame and between the first portion and the second portion. The curved portion is spaced from the steering post in the vehicle-rearward direction. The first portion and the second portion are spaced from the steering post in a cross-vehicle direction.

The vehicle may include a pair of body sides each supported by the first post and the second post. The body sides may extend in the vehicle-rearward direction from each of the first post and the second post. The curved portion may be spaced equidistantly from each of the body sides.

The steering post reinforcement may be continuous from the first end to the second end.

The first portion and the second portion may be elongated along a vehicle-longitudinal axis.

The vehicle may include a seat spaced from the steering post in the vehicle-rearward direction. The curved position may be between the steering post and the seat.

The seat may define an occupant seating area. The curved portion may be between the steering post and the occupant seating area.

The steering post reinforcement may extend vehicle-rearward of the first post and the second post.

The vehicle frame may include a crossbeam extending from the first post to the second post. The first end and the second end may be fixed to the crossbeam.

The opening may be vehicle-rearward of the crossbeam and the opening extends from the curved portion to the crossbeam.

The steering post may be between the crossbeam and the curved portion.

The steering post reinforcement may be fixed to the crossbeam at a position equidistant from the first post and the second post.

The first portion and the second portion may be elongated in the vehicle-rearward direction from the crossbeam to the curved portion.

The first portion and the second portion may be parallel to each other from the crossbeam to the curved portion.

At least a portion of the steering post may be vehicle-rearward of the crossbeam at the steering post reinforcement.

The steering post may be spaced from the crossbeam.

The steering post reinforcement may extend from the first post to the second post. The first end may be fixed to the first post and the second end may be fixed to the second post.

The vehicle may include a wheel spaced vehicle-forward of the vehicle frame and coupled to the steering post. The wheel may be aligned in the cross-vehicle direction with the steering post reinforcement.

The vehicle frame may include a frame member supporting the steering post between the first post and the second post. The frame member may support the steering post between the steering post reinforcement and the wheel along the axis.

The steering post reinforcement may be spaced upwardly from the frame member.

The vehicle may include a steering device supported by the steering post. The steering post reinforcement may be between the frame member and the steering device.

With reference to the Figures, wherein like numerals indicate like parts throughout the several views, a vehicle 10, specifically a three-wheeled vehicle 10, includes a vehicle frame 12 including a first post 14 and a second post 16 spaced cross-vehicle from the first post 14. The vehicle includes a steering post 18 rotatably supported by the vehicle frame 12. The steering post 18 extends along an axis B between the first post 14 and the second post 16. The vehicle 10 includes a steering post reinforcement 20 having a first end 22 and a second end 24 each fixed to the vehicle frame 12 and a curved portion 26 curving about the axis B between the first end 22 and the second end 24. The steering post reinforcement 20 includes a first portion 28 extending from the first end 22 to the curved portion 26 and a second portion 30 extending from the second end 24 to the curved portion 26. The first portion 28 and the second portion 30 are elongated from the vehicle frame 12 to the curved portion 26 in a vehicle-rearward direction R of the vehicle frame 12. The curved portion 26 defines an opening 32 between the curved portion 26 and the vehicle frame 12 and between the first end 22 and the second end 24. The steering post 18 extends through the opening 32 between the curved portion 26 and the vehicle frame 12 and between the first portion 28 and the second portion 30. The curved portion 26 is spaced from the steering post 18 in the vehicle-rearward direction R. The first portion 28 and the second portion 30 are spaced from the steering post 18 in a cross-vehicle direction C.

In the event of certain vehicle impacts, a force of the vehicle impact may be applied to the steering post 18 that moves the steering post 18 in the vehicle-rearward direction R. The steering post reinforcement 20 applies a counter force to the steering post 18 to rotate a top portion of the steering post 18 way from an occupant of the three-wheeled vehicle 10. The steering post 18 may contact the curved portion 26 of the steering post reinforcement 20 to rotate the top portion of the steering post 18 way from the occupant. In other words, the steering post 18 may rotate about the steering post reinforcement 20 to move the steering post 18 way from the occupant.

Figure 4:
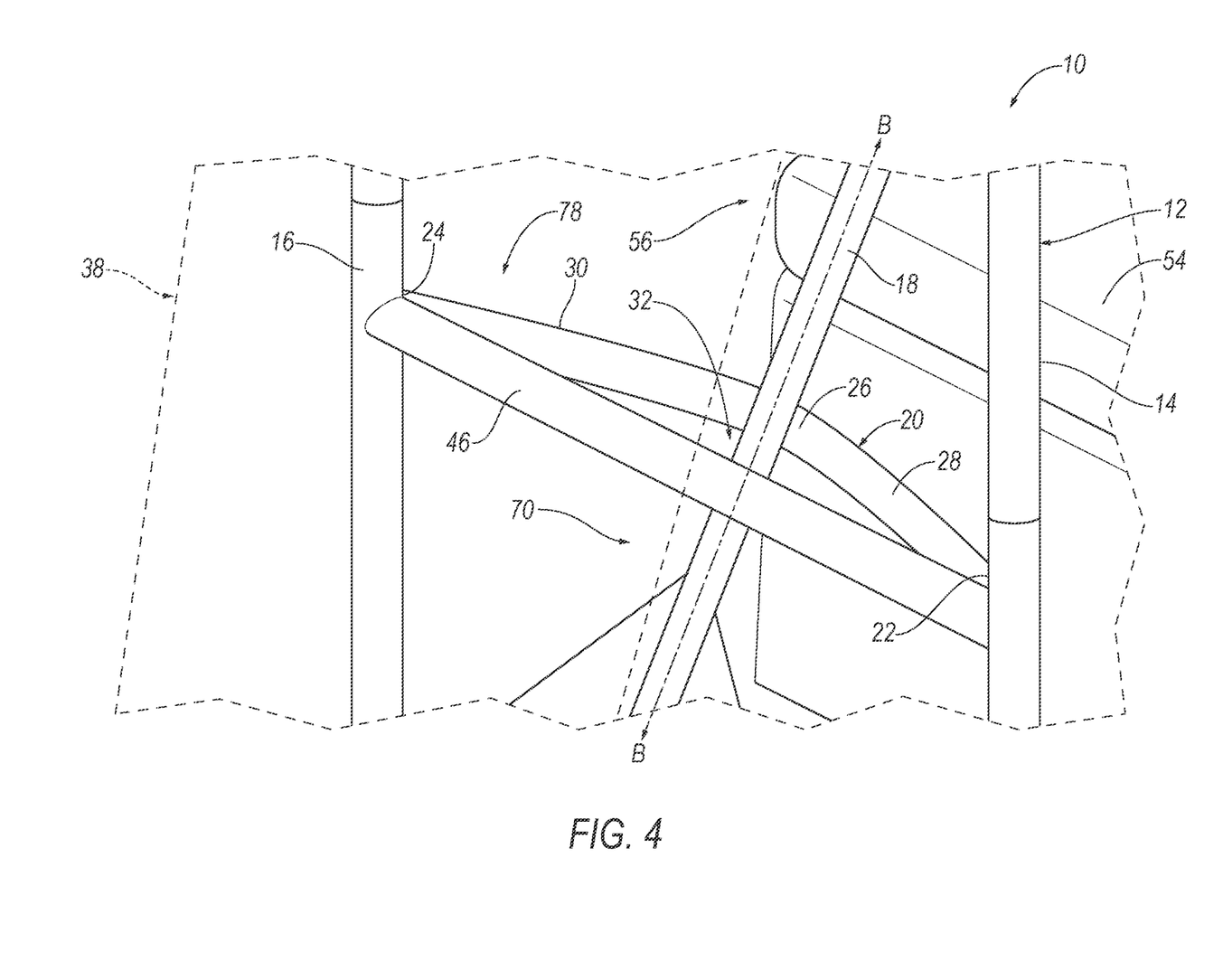
FIG. 4 is a perspective view of a second example of the steering post reinforcement for the three-wheeled vehicle.
Figure 5A:
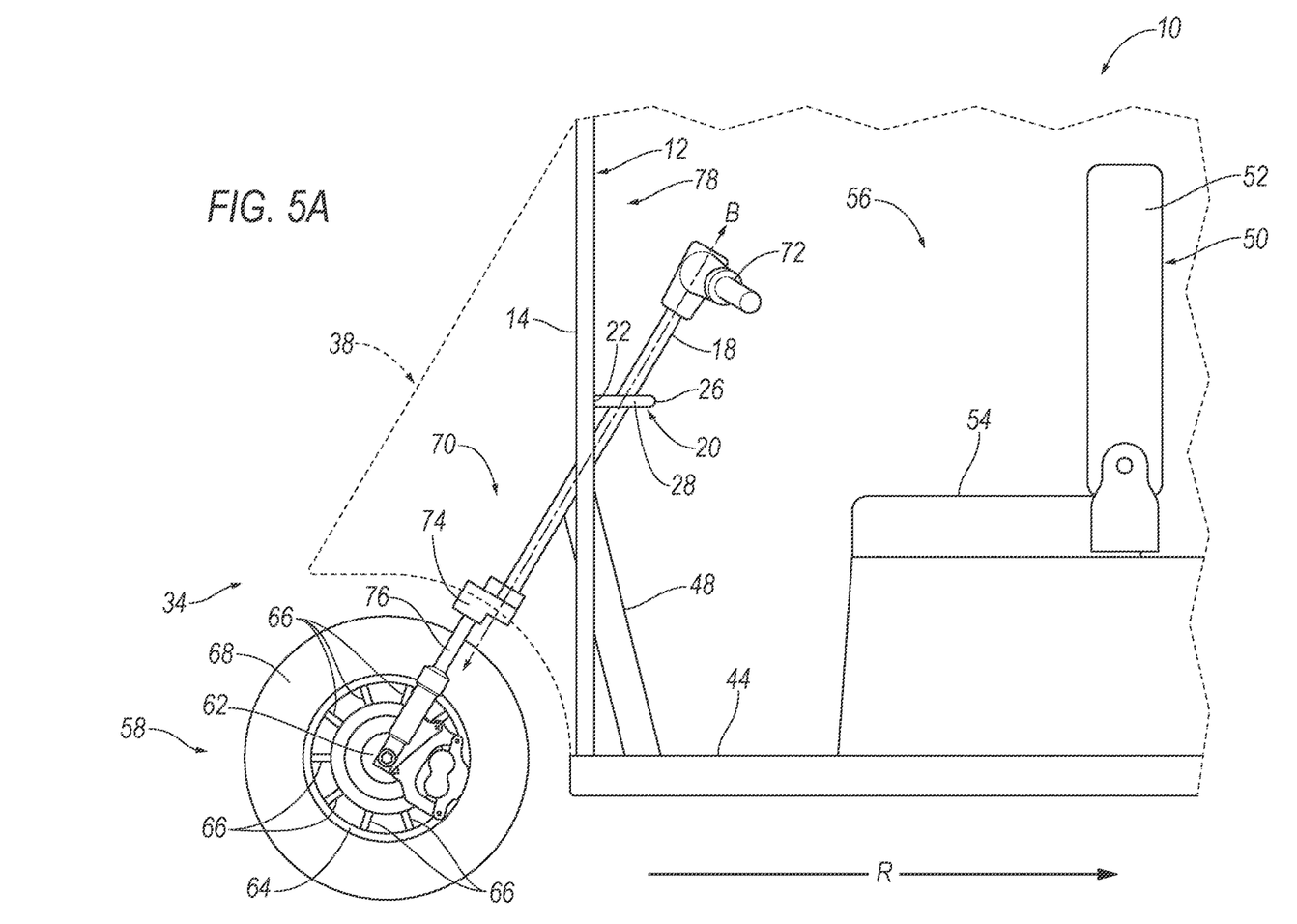
FIG. 5A is a side view of the three-wheeled vehicle prior to certain vehicle impacts.
Figure 5B:
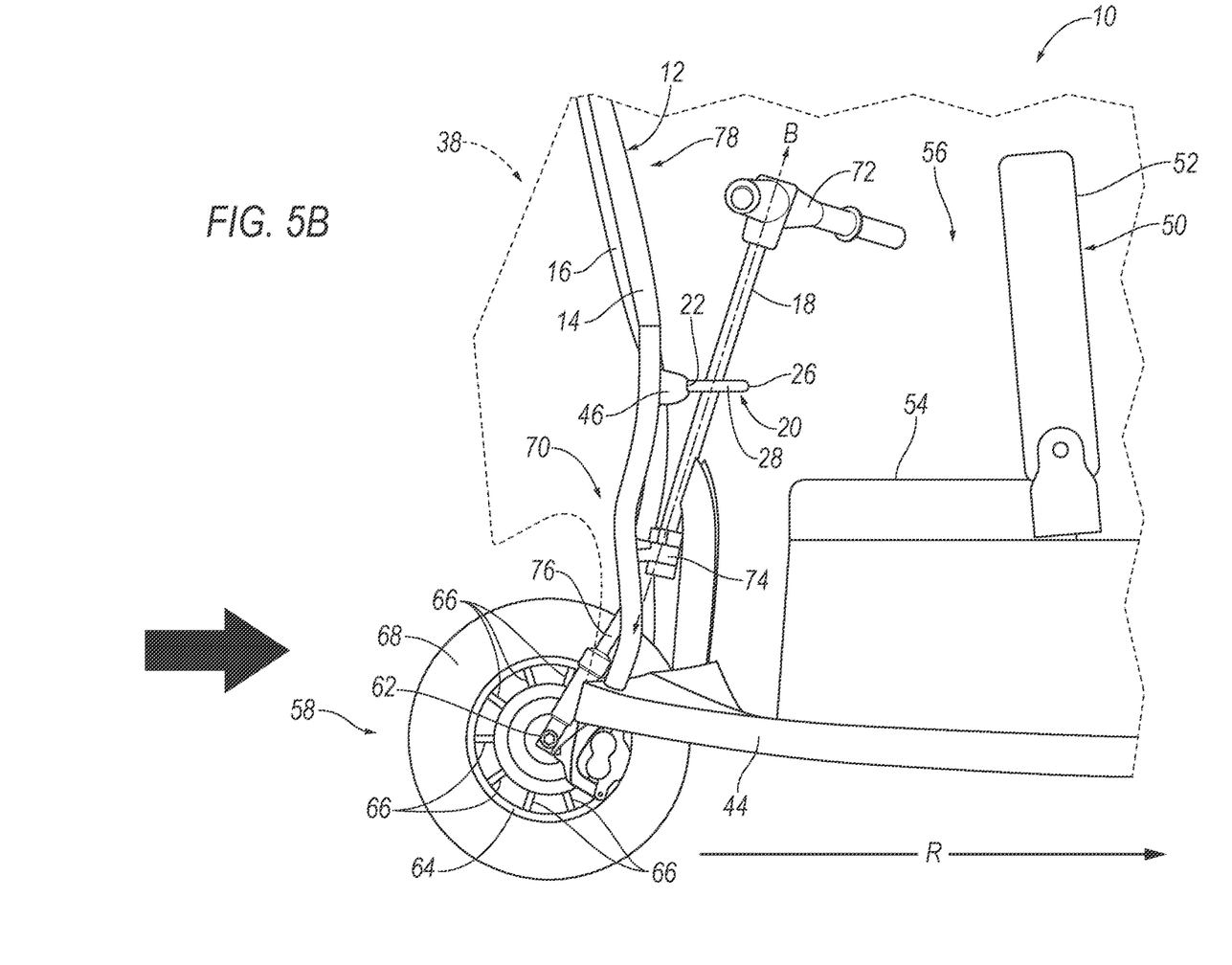
FIG. 5B is a side view of a representation of the three-wheeled vehicle after certain vehicle impacts.

Two examples of the steering post reinforcement 20 are shown in the Figures and common numerals are used to identify common features in the example embodiments. A first example of the steering post reinforcement 20 is shown in FIGS. 2-3 and 5A-5B. In such an example, the steering post reinforcement 20 may be fixed to a crossbeam 46 of the vehicle frame 12. A second example of the steering post reinforcement 20 is shown in FIG. 4. In such an example, the steering post reinforcement 20 is fixed to the first post 14 and the second post 16 of the vehicle frame 12.

Figure 1:
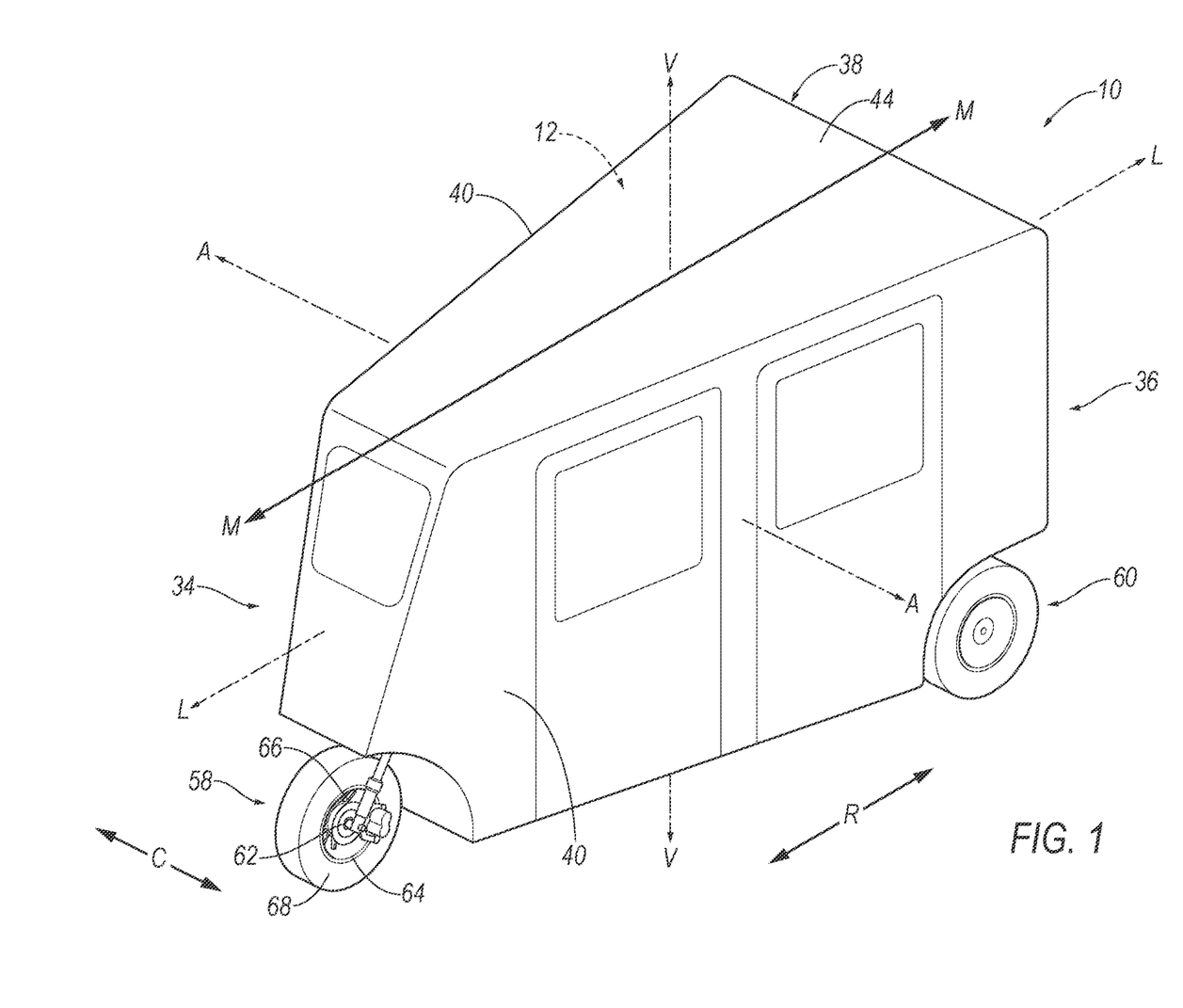
FIG. 1 is a perspective view of a three-wheeled vehicle.
Figure 2:
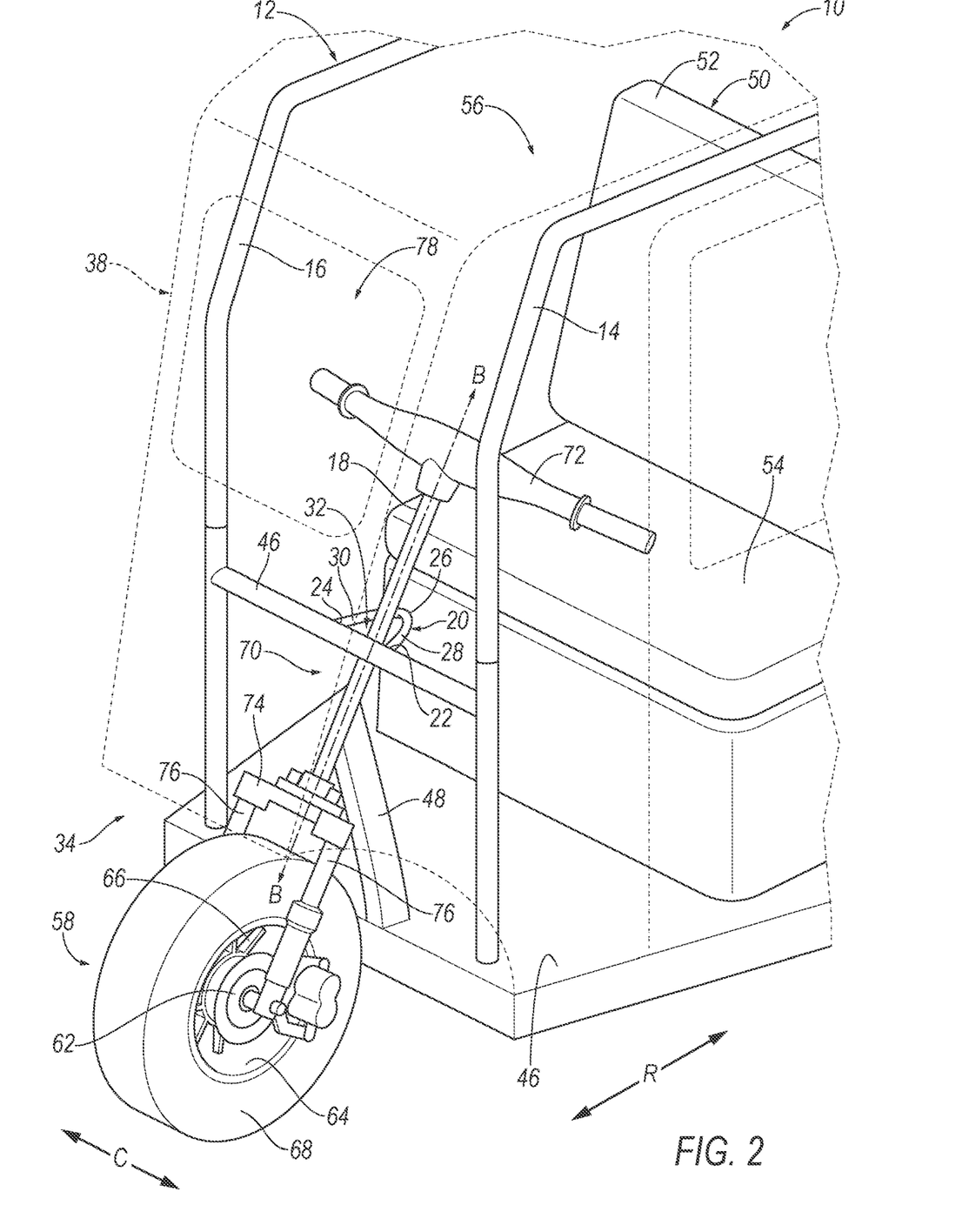
FIG. 2 is a perspective view of a vehicle frame and a first example of a steering post reinforcement of the three-wheeled vehicle.
Figure 3:
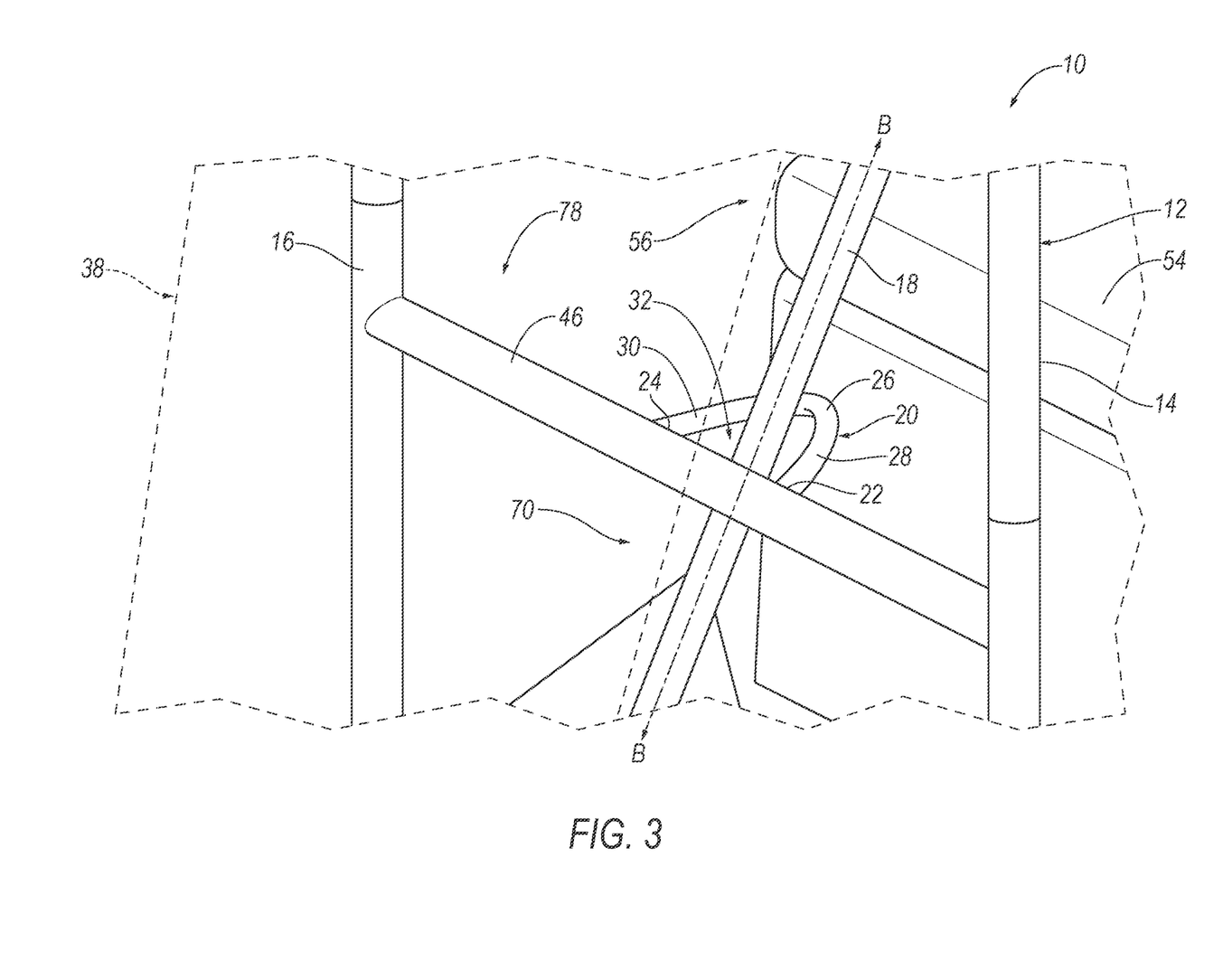
FIG. 3 is a perspective view of the first example of the steering post reinforcement for the three-wheeled vehicle.

With reference to FIG. 1, the three-wheeled vehicle 10 may be any suitable type of ground vehicle, e.g., a passenger or commercial automobile. For example, the three-wheeled vehicle 10 may be any suitable type of ground vehicle, e.g., a motorized tricycle, auto rickshaw, tuk, etc. As shown in the Figures, the three-wheeled vehicle 10 may be a motorcycle-based vehicle.

The three-wheeled vehicle 10 defines a vehicle-longitudinal axis L extending between a front vehicle end 34 and a rear vehicle end 36 of the three-wheeled vehicle 10. The three-wheeled vehicle 10 defines a cross-vehicle axis A extending cross-vehicle from one side to the other side of the three-wheeled vehicle 10. The cross-vehicle direction C is parallel to the cross-vehicle axis A. The three-wheeled vehicle 10 defines a vertical axis V. The vehicle-longitudinal axis L, the cross-vehicle axis A, and the vertical axis V are perpendicular relative to each other.

The three-wheeled vehicle 10 includes the vehicle frame 12 and a vehicle body 38. The vehicle frame 12 may be of a unibody construction in which the vehicle frame 12 is unitary with the vehicle body 38 including frame rails, pillars, roof rails, etc. As another example, the vehicle body 38 and vehicle frame 12 may have a body-on-frame construction also referred to as a cab-on-frame construction in which the vehicle body 38 and vehicle frame 12 are separate components, i.e., are modular, and the vehicle body 38 is supported on and affixed to the frame. Alternatively, the vehicle frame 12 and vehicle body 38 may have any suitable construction. The vehicle frame 12 and vehicle body 38 may be of any suitable material, for example, steel, aluminum, and/or fiber-reinforced plastic, etc.

With reference to FIGS. 2-5B, the three-wheeled vehicle 10 may house one or more occupants. Specifically, the vehicle frame 12 defines an occupant compartment to house one or more occupants of the three-wheeled vehicle 10. The occupant compartment may extend across the three-wheeled vehicle 10, i.e., from one side to the other side of the three-wheeled vehicle 10. The occupant compartment may extend from a front end 78 to a rear end (not numbered) with the front end 78 being in front of the rear end during forward motion of the three-wheeled vehicle 10. The three-wheeled vehicle 10 may accommodate one or more occupants. For example, as shown in the Figures, the three-wheeled vehicle 10 may accommodate more than one occupant, e.g., two or three occupants. In other examples not shown in the Figures, the three-wheeled vehicle 10 may accommodate a single occupant. In other words, the occupant compartment is sized and shaped to house only one occupant.

The three-wheeled vehicle 10 may define a midline M elongated along the vehicle-longitudinal axis L, i.e., vehicle fore-and-aft. The midline M of the vehicle frame 12 may be spaced equidistantly from each side of the three-wheeled vehicle 10. In other words, the midline M is in the middle of the vehicle frame 12. The vehicle frame 12 is elongated along the midline M and the vehicle-longitudinal axis L. Specifically, the vehicle frame 12 is elongated from the front end 78 to the rear end along the midline M and the vehicle-longitudinal.

With reference to FIG. 1, the three-wheeled vehicle 10 may include a plurality of body panels (not all numbered). The body panels may be supported by the vehicle frame 12. Specifically, the body panels may be fixed to the vehicle frame 12. For example, the three-wheeled vehicle 10 may include a pair of body sides 40 each supported on either side of the three-wheeled vehicle 10. A body side 40 may be supported on each side of the midline M of the three-wheeled vehicle 10. The body sides 40 are each supported by at least the first post 14 and the second post 16 and may be supported by other members of the three-wheeled vehicle 10. The body sides 40 extend in the vehicle-rearward direction R from each of the first post 14 and the second post 16. In other words, the body sides 40 extend from the first post 14 and the second post 16 toward the rear vehicle end 36. The body panels may be fixed to the vehicle frame 12 in any suitable manner, e.g., fasteners, welding, etc. The three-wheeled vehicle 10 may include any suitable number of body panels supported by the vehicle frame 12 at any suitable location of the three-wheeled vehicle 10. For example, the three-wheeled vehicle 10 may include a vehicle floor 42, a vehicle roof 44, etc. The body panels may be made of any suitable material, e.g., steel, aluminum, composite, plastic, etc.

The vehicle roof 44 and the vehicle floor 42 are spaced from each other. Specifically, the vehicle floor 42 is spaced downwardly from the vehicle roof 44. The vehicle roof 44 defines the upper boundary of the occupant compartment and may extend from the front end 78 of the occupant compartment to the rear end of the occupant compartment.

The vehicle floor 42 defines the lower boundary of the occupant compartment and may extend from the front end 78 of the occupant compartment to the rear end of the occupant compartment. The vehicle floor 42 may include upholstery, for example, carpet, and may have a class-A surface facing the occupant compartment, i.e., a surface specifically manufactured to have a high quality, finished, aesthetic appearance free of blemishes.

The vehicle frame 12 may extend from the front end 78 to the rear end. The rear end may be wider than the front end 78. Because the vehicle frame 12 is wider at the rear end than at the front end 78, more occupants may be able to be housed at the rear end of the vehicle frame 12 and occupant compartment.

With reference to FIGS. 2-5B, the vehicle frame 12 may include any suitable number of members (not all shown) to define a shape of the three-wheeled vehicle 10. For example, as shown in the Figures, the vehicle frame 12 includes the first post 14 and the second post 16 spaced cross-vehicle from each other at the front end 78. In some examples, such as shown in the Figures, the vehicle frame 12 may include the crossbeam 46 extending from the first post 14 to the second post 16. In other examples, the three-wheeled vehicle 10 may not include a crossbeam 46. The vehicle frame 12 may include a floor frame member 48 extending upwardly from the vehicle floor 42 to the steering post 18. As described further below, the steering post 18 is supported by the vehicle frame 12 at the floor frame member 48. Specifically, the steering post 18 is rotatably supported by the floor frame member 48 between the first post 14 and the second post 16.

The three-wheeled vehicle 10 may include one or more seats 50 in the occupant compartment. For example, as shown in the Figures, the three-wheeled vehicle 10 may include a front seat 50, herein after referred to as the "seat 50," and a rear seat (not shown) in the occupant compartment. The front seat 50 may be adjacent the front end 78 and the rear seat may be adjacent the rear end. In other words, the front seat 50 may be vehicle-forward of the rear seat. The three-wheeled vehicle 10 may be driven by an occupant of front seat 50 and other occupants may be seated in the rear seat as passengers.

The seat 50 may include a seatback 52 and a seat bottom 54. The seatback 52 may be supported by the seat bottom 54 and may be stationary or movable relative to the seat bottom 54. The seatback 52 and the seat bottom 54 may be adjustable in multiple degrees of freedom. The seat 50 may be moveable relative to the vehicle floor 42 to various positions, e.g., movable fore-and-aft and/or cross-vehicle. The seat 50 may be of any suitable type, e.g., a bucket seat or a bench seat elongated across the occupant compartment.

The seat 50 defines an occupant seating area 56. The occupant seating area 56 is the area occupied by an occupant when properly seated on the seat 50. The occupant seating area 56 is in a seat-forward direction (not labeled) of the seatback 52 and above the seat bottom 54.

The three-wheeled vehicle 10 may include one or more vehicle doors (not numbered) openable relative to the vehicle frame 12 for occupant ingress and egress. In other words, the vehicle doors provides access to the seat 50 in the occupant compartment. The three-wheeled vehicle 10 may include one or more vehicle doors per side of the three-wheeled vehicle 10. In the example shown in the Figures, the vehicle may include a vehicle door adjacent the front seat 50 and a vehicle door adjacent the rear seat. The three-wheeled vehicle 10 may include an equal number of vehicle doors on the opposite side of the three-wheeled vehicle 10. The vehicle door may be hingedly connected to the vehicle frame 12.

As shown in the Figures, the three-wheeled vehicle 10 includes a single front wheel 58 and two rear wheels 60. The front wheel 58 is disposed vehicle-forward of the front end 78 of the occupant compartment and the rear wheels 60 are disposed adjacent the rear end. In other words, the front wheel 58 is disposed at the front vehicle end 34 and the rear wheels 60 are disposed at the rear vehicle end 36. The front wheel 58 and rear wheels 60 are supported by the vehicle frame 12. The front wheel 58 is supported by the vehicle frame 12 and is spaced vehicle-forward of the vehicle frame 12 and the rear wheels 60 are supported by the vehicle adjacent the rear end. Specifically, the front wheel 58 is supported by the vehicle frame 12 vehicle-forward of the front end 78 and the rear wheels 60 are supported by the vehicle frame 12 adjacent the rear end. The front wheel 58 is disposed at the midline M. In other words, the front wheel 58 is spaced equidistantly from each side of the three-wheeled vehicle 10 in the cross-vehicle direction C. The rear wheels 60 may be disposed on each side of the three-wheeled vehicle 10 at the rear end of the three-wheeled vehicle 10. In other words, the rear wheels 60 are spaced cross-vehicle from each other. The three-wheeled vehicle 10 may include a rear wheel 60 on each side of the midline M of the three-wheeled vehicle 10.

The front wheel 58 and the two rear wheels 60 are rotatable relative to the vehicle frame 12. Each front wheel 58 and rear wheel 60 may include a hub 62 about which the wheels rotate, a rim 64 concentric with the hub 62, a plurality of spokes 66 spaced circumferentially about the hub 62 and extending from the hub 62 to the rim 64, and a tire 68 fitted about the rim 64. The front wheel 58 and the rear wheels 60 include an axel (not shown) supported by the vehicle frame 12 that extends through the hub 62 and the hub 62, rim 64 and tire 68 are rotatable relative to the axel. In other words, the hub 62, the rim 64, and the tire 68 rotate about the axel to allow the wheels to rotate relative to the vehicle frame 12. The axel is supported by the vehicle frame 12 in any suitable way. As described further below, the axel is coupled to a steering system 70 to allow the front wheel 58 to be steered by an occupant.

The three-wheeled vehicle 10 may include any suitable number of subsystems coupled to one or more of the front wheel 58 and rear wheels 60. For example, the three-wheeled vehicle 10 may include a suspension system (not numbered) that absorbs and dampens shocks and vibrations from the wheels, a braking system that decelerates the three-wheeled vehicle 10, a powertrain to drive the front wheel 58 or the rear wheels 60, the steering system 70 as described further below, and/or any other suitable subsystems.

With continued reference to FIGS. 2-5B, the three-wheeled vehicle 10 includes the steering system 70 positioned at the front end 78. The steering system 70 is coupled to the front wheel 58 to allow an occupant to steer the three-wheeled vehicle 10 as the three-wheeled vehicle 10 is in motion. The steering system 70 is rotatably supported by the vehicle frame 12 to steer the three-wheeled vehicle 10. The steering system 70 is elongated upwardly from the hub 62 and the axel of the front wheel 58 to a steering device 72 inside the occupant compartment, e.g., handlebars, a steering wheel, etc. In other words, the steering system 70 is elongated upwardly from the hub 62 and the axel and into the occupant compartment to allow the occupant to have access to the steering device 72 inside the occupant compartment. The steering system 70 is aligned with the midline M of the three-wheeled vehicle 10. In other words, the steering system 70 may be positioned between the first post 14 and the second post 16 of the vehicle frame 12.

The steering system 70 includes the steering post 18, a crossbar 74, and a pair of beams 76. The steering device 72 is supported by the steering post 18. Specifically, the steering device 72 extends downwardly from the steering device 72 to the crossbar 74. The steering post 18 may be elongated along an axis B. The steering post 18 may be aligned with the midline M of the three-wheeled vehicle 10. In other words, the steering post 18 may be between the first post 14 and the second post 16. The seat 50 is spaced from the steering post 18 in the vehicle-rearward direction R. In other words, the steering post 18 is vehicle-forward of the seat 50.

The steering post 18 is rotatably supported by the vehicle frame 12. The floor frame member 48 extends upwardly from the vehicle floor 42 to the steering post 18. The steering post 18 is rotatably supported by the floor frame member 48. In other words, the steering post 18 is rotatable relative to the vehicle frame 12, i.e., the floor frame member 48. Specifically, the steering post 18 is rotatable about the axis B elongated along the steering post 18. When an occupant turns the three-wheeled vehicle 10, the occupant turns the steering device 72 in the desired direction, e.g., clockwise or counterclockwise, and the steering post 18 rotates about the axis B in the desired direction. Turning the steering device 72 turns the steering post 18 to allow the three-wheeled vehicle 10 to turn right or left during forward and rearward motion of the three-wheeled vehicle 10.

The steering post 18 is connected to the front wheel 58 such that when an occupant turns the steering device 72, the steering post 18 rotates to turn the front wheel 58 in the desired direction of the occupant. In other words, the steering post 18 is coupled to the front wheel 58. As in the example shown in the Figures, the steering post 18 is indirectly connected to the front wheel 58. In other words, other components, for example the crossbar 74 and beams 76 as described below, may be between the steering post 18 and the front wheel 58 such that when the steering post 18 rotates about the axis B, the front wheel 58 rotates in the desired direction of the occupant.

The crossbar 74 is elongated in the cross-vehicle direction C. The crossbar 74 is positioned along the cross-vehicle axis A between cross-vehicle positions of the first post 14 and the second post 16 along the cross-vehicle axis A. The crossbar 74 may be elongated parallel to the crossbeam 46 of the vehicle frame 12. Specifically, the crossbar 74 is elongated in the cross-vehicle direction C from the first end 22 to the second end 24. When the steering post 18 is positioned such that the three-wheeled vehicle 10 moves in the forward direction, the first end 22 may be adjacent the first post 14 of the vehicle frame 12 and the second end 24 may be adjacent the second post 16 of the vehicle frame 12.

The crossbar 74 is fixed to the steering post 18 such that the crossbar 74 is bisected by the steering post 18. In other words, a first distance from the first end 22 to the steering post 18 and a second distance from the second end 24 to the steering post 18 are equal. As the steering post 18 rotates about the axis B, the first end 22 and the second end 24 rotate about the axis B at equal distances from the steering post 18.

The steering system 70 includes a pair of beams 76. Each of the beams 76 of the steering system 70 extend downwardly from the crossbar 74. In other words, the beams 76 are elongated from the crossbar 74 toward the front wheel 58. Specifically, one of the beams 76 is elongated downwardly from the first end 22 of the crossbar 74 and the other of the beams 76 is elongated downwardly from the second end 24 of the crossbar 74 with the steering post 18 being between the beams 76.

The beams 76 are coupled to the front wheel 58. In other words, the beams 76 extend from the crossbar 74 to the front wheel 58. Specifically, the beams 76 extend from the crossbar 74 to the hub 62 and axel of the front wheel 58. One of the beams 76 is on one side of the front wheel 58 and the other beam 76 is on the other side of the front wheel 58. In other words, the front wheel 58 is between the beams 76. Each of the beams 76 is coupled to the axel of the front wheel 58. In other words, the beams 76 are on both sides of the front wheel 58 and connected to the axel on each side of the front wheel 58. The beams 76 may be included in or connected to the braking system and/or the suspension system of the front wheel 58.

With continued reference to FIGS. 2-5B, the vehicle includes the steering post reinforcement 20 supported by the vehicle frame 12. Specifically, the steering post reinforcement 20 is fixed to the vehicle frame 12. The steering post reinforcement 20 extends vehicle-rearward from the vehicle frame 12 along the vehicle-longitudinal axis L. The steering post reinforcement 20 extends from the vehicle frame 12 toward the seat 50 of the three-wheeled vehicle 10. The steering post reinforcement 20 extends completely around the steering post 18 from the vehicle frame 12 and back to the vehicle frame 12. In other words, the steering post reinforcement 20 extends completely around the axis B of the steering post 18. At least a portion of the steering post 18 is vehicle-rearward of the vehicle frame 12 at the steering post reinforcement 20. Specifically, the steering post 18 is vehicle-rearward of the crossbeam 46 of the vehicle frame 12 at the steering post reinforcement 20. For example, where the steering post reinforcement 20 extends around the steering post 18, the steering post 18 is vehicle-rearward of the crossbeam 46. The steering post reinforcement 20 extends completely around the steering post 18 from the vehicle frame 12 to the vehicle frame 12.

The steering post reinforcement 20 is supported by the vehicle frame 12 at a location that is spaced upwardly from the vehicle floor 42. Specifically, the steering post reinforcement 20 is spaced upwardly from the vehicle floor 42 along the vehicle vertical axis V. The steering post 18 is supported by the floor frame member 48 between the steering post reinforcement 20 and the front wheel 58 along the axis. The steering post reinforcement 20 is between the floor frame member 48 and the steering device 72 along the axis B of the steering post 18.

The steering post reinforcement 20 extends from the vehicle frame 12. Specifically, the steering post reinforcement 20 is elongated from the vehicle frame 12 along the vehicle-longitudinal axis L. The steering post reinforcement 20 is elongated in the vehicle-rearward direction R from the vehicle frame 12. The steering post reinforcement 20 extends vehicle-rearward from the vehicle frame 12 and vehicle-rearward of at least a portion of the vehicle frame 12. For example, the steering post reinforcement 20 extends vehicle-rearward of the first post 14 and the second post 16.

The steering post reinforcement 20 includes the first end 22, the second end 24, the curved portion 26, the first portion 28 and the second portion 30. The steering post reinforcement 20 extends from the first end 22 to the second end 24. The first end 22 and the second end 24 are each fixed to the vehicle frame 12. In other words, the first end 22 is fixed to the vehicle frame 12 and the second end 24 is fixed to the vehicle frame 12. The first end 22 is fixed at a position spaced cross-vehicle from a position to which the second end 24 is fixed. In other words, the first end 22 is spaced cross-vehicle from each other. Two examples of the locations where the first end 22 and the second end 24 are discussed further below. The first end 22 may be fixed to the vehicle frame 12 in any suitable way, e.g., welding, fasteners, straps, brackets, etc.

The first portion 28 and the second portion 30 are supported by the vehicle frame 12. Specifically, the first portion 28 and the second portion 30 are fixed to the vehicle frame 12. The first portion 28 may include the first end 22 fixed to the vehicle frame 12 and the second portion 30 may include the second end 24 fixed to the vehicle frame 12. The first portion 28 extends from the first end 22 to the curved portion 26 and the second portion 30 extends from the second end 24 to the curved portion 26. In other words, the first portion 28 and the second portion 30 are elongated from the vehicle frame 12 to the curved portion 26. The first portion 28 and the second portion 30 may be elongated from the vehicle frame 12 in the vehicle-rearward direction R of the vehicle frame 12. Specifically, the first portion 28 and the second portion 30 are elongated along the vehicle-longitudinal axis L toward the seat 50 of the three-wheeled vehicle 10.

The curved portion 26 is between the first end 22 and second end 24. In other words, the curved portion 26 is between the first end 22 and the second end 24 along the steering post reinforcement 20. The curved portion 26 is between the first portion 28 and the second portion 30 along the steering post reinforcement 20. Specifically, the curved portion 26 extends from the first portion 28 to the second portion 30. The curved portion 26 curves between the first end 22 and the second end 24. The curved portion 26 curves between the first portion 28 and the second portion 30. Specifically, the curved portion 26 curves from the first portion 28 to the second portion 30. The curved portion 26 curves about the axis B of the steering post 18 between the first end 22 and the second end 24. The curved portion 26 extends around the steering post 18.

With continued reference to FIGS. 2-5B, the curved portion 26 is distal to the first end 22 and the second end 24 of the steering post reinforcement 20. Specifically, the curved portion 26 is spaced from the first end 22 and the second end 24 along the vehicle-longitudinal axis L. The curved portion 26 is spaced from the vehicle frame 12 along the vehicle-longitudinal axis L. The curved portion 26 is spaced from the vehicle frame 12, the first end 22 and the second end 24 by the first portion 28 and the second portion 30. In other words, the curved portion 26 is spaced from the vehicle frame 12 along the vehicle-longitudinal axis L by the first portion 28 and the second portion 30.

The curved portion 26 is aligned with the steering post 18 of the three-wheeled vehicle 10. Specifically, the curved portion 26 is aligned with the midline M of the three-wheeled vehicle 10. The curved portion 26 is spaced equidistantly from each side of the three-wheeled vehicle 10, e.g., of the body sides 40. In other words, the curved portion 26 is spaced from the body sides 40 in the cross-vehicle direction C. The curved portion 26 may be symmetrical about the midline M of the three-wheeled vehicle 10. In other words, the curved portion 26 is identical on either side of the midline M.

The curved portion 26 is between the steering post 18 and the occupant at a location along the steering post 18. The curved position is between the steering post 18 and the seat 50 along the vehicle-longitudinal axis L. In other words, the curved portion 26 curves about the steering post 18 between the steering post 18 and the seat 50. Specifically, the curved portion 26 is between the steering post 18 and the occupant seating area 56.

The steering post reinforcement 20 is continuous from the vehicle frame 12 to the vehicle frame 12. Specifically, the steering post reinforcement 20 is continuous from the first end 22 to the second end 24. In other words, the steering post reinforcement 20 is solid and unbroken between the first end 22 and the second end 24. In other words, the steering post reinforcement 20 between endless from the first end 22 and the second end 24. The steering post reinforcement 20 being continuous allows the steering post reinforcement 20 to extend completely around the steering post 18, e.g., the axis B of the steering post 18 from the vehicle frame 12 to the vehicle frame 12.

The curved portion 26 defines an opening 32 between the curved portion 26 and the vehicle frame 12 and between the first end 22 and the second end 24. Specifically, the opening 32 is between the curved portion 26 and the vehicle frame 12 and between the first portion 28 and the second portion 30. In other words, the steering post reinforcement 20 extends from the first end 22 to the curved portion 26 and from the curved portion 26 to the second end 24 to define the opening 32 between the curved portion 26 and the vehicle frame 12 and the first end 22 and the second end 24.

The opening 32 is a void between the steering post reinforcement 20 and the vehicle frame 12 through which the steering post 18 extends through. In other words, the steering post 18 extends through the opening 32. The steering post 18 extends through the curved portion 26 and the vehicle frame 12 and between the first portion 28 and the second portion 30. Where the steering post 18 extends through the opening 32, the steering post 18 is between the curved portion 26 and the vehicle frame 12 and the steering post 18 is between the first portion 28 and the second portion 30 of the steering post reinforcement 20.

Although the steering post 18 extends through the opening 32, the steering post 18 does not contact the steering post reinforcement 20 during normal operation of the three-wheeled vehicle 10. The first portion 28 and the second portion 30 are spaced cross-vehicle from each other. The first portion 28 and the second portion 30 are spaced from the steering post 18 in the cross-vehicle direction C. The curved portion 26 is spaced from the steering post 18 in the vehicle-rearward direction R. Specifically, the curved portion 26 is spaced from the steering post 18 in the vehicle-rearward direction R along the vehicle-longitudinal axis L. At the opening 32, the steering post 18 is spaced from the vehicle frame 12. In other words, the steering post 18 is spaced from steering post reinforcement 20 and the vehicle frame 12 at the opening 32.

The steering post reinforcement 20 may be of any suitable material. For example, the steering post reinforcement 20 may be of a solid, rigid material, e.g., steel, iron, other suitable metals. In other examples, the steering post reinforcement 20 may be of a flexible material, e.g., metal cable, fabric straps, etc.

As discussed above, the steering post reinforcement 20 is fixed to the vehicle frame 12. Below, two examples of portions of the vehicle frame 12 to which the steering post reinforcement 20 is fixed are shown. The steering post reinforcement 20 may be fixed to any other suitable portion of the vehicle frame 12.

In the example shown in FIGS. 2-3 and 5A-5B, the first end 22 and the second end 24 are fixed to the crossbeam 46 of the vehicle frame 12. Specifically, the first portion 28 and the second portion 30 are fixed to the crossbeam 46 of the vehicle frame 12. The steering post reinforcement 20 is fixed to the crossbeam 46 at a position equidistant from the first post 14 and the second post 16. In other words, the steering post reinforcement 20 is fixed at the midline M of the three-wheeled vehicle 10. The first portion 28 and the second portion 30 of the steering post reinforcement 20 are elongated in the vehicle-rearward direction R from the crossbeam 46 to the curved portion 26. The first portion 28 and the second portion 30 are parallel to each other from the crossbeam 46 to the curved portion 26. In other words, the first portion 28 and the second portion 30 are elongated along axes that do not intersect. The first portion 28 and the second portion 30 are elongated along the vehicle-longitudinal axis L. The first portion 28 and the second portion 30 may extend from the crossbeam 46 toward the seat 50 and occupant seating area 56 to the curved portion 26. In other words, the curved portion 26 is spaced vehicle-rearward from the crossbeam 46 by the first portion 28 and the second portion 30.

With continued reference to the example shown in FIGS. 2-3 and 5A-5B, the opening 32 is defined by the curved portion 26. Specifically, the opening 32 is vehicle-rearward of the crossbeam 46 and the opening 32 extends from the curved portion 26 to the crossbeam 46. The steering post reinforcement 20 extends through the opening 32. The location that the steering post reinforcement 20 extends through the opening 32, the steering post 18 is between the crossbeam 46 and the curved portion 26.

In the example shown in FIG. 4, the steering post reinforcement 20 extends from the first post 14 to the second post 16. Specifically, the first end 22 is fixed to the first post 14 and the second end 24 is fixed to the second post 16. In such an example, the first portion 28 extends from the first post 14 to the curved portion 26 and the second portion 30 extends from the second post 16 to the curved portion 26. In examples having the crossbeam 46, such as shown in the Figures, the opening 32 is between the crossbeam 46 and the curved portion 26. The steering post 18 extends through the opening 32 between the curved portion 26 and the crossbeam 46 and between the first portion 28 and the second portion 30.

The crossbar 74 is supported by the steering post 18. In other words, the crossbar 74 is connected to the steering post 18. Specifically, the crossbar 74 is fixed to the steering post 18. As an occupant is turning the three-wheeled vehicle 10, the occupant may rotate the steering device 72 which rotates the steering post 18 about the axis B. As the steering post 18 rotates about the axis B, the crossbar 74 rotates about the axis B. In other words, both the steering post 18 and the crossbar 74 rotate about the axis B as a unit.

During normal operation of the three-wheeled vehicle 10, the steering post reinforcement 20 does not provide any structural support to the steering post 18. In other words, the steering post reinforcement 20 extends around the steering post 18 but does not contact the steering post 18 or provide any direct or indirect structure to the steering post 18. In the event of certain vehicle impacts, e.g., certain frontal vehicle impacts, the steering post reinforcement 20 may manage deformation into the three-wheeled vehicle 10. A force from the vehicle impact may be applied to the front wheel 58 and to the steering post 18 in the vehicle-rearward direction R along the vehicle-longitudinal axis L during the vehicle impact. The force against the front wheel 58 may move the steering post 18 toward the occupant of the seat 50 of the three-wheeled vehicle 10. The steering post reinforcement 20 extending around steering post 18 provides a counter force along the vehicle-longitudinal axis L to the steering post 18 to rotate a top portion, e.g., including the steering device 72, of the steering post 18 away from the occupant of the three-wheeled vehicle 10. The steering post reinforcement 20 allows a bottom portion of the steering post 18 toward the occupant which rotates the top portion away from the occupant. In other words, the steering post 18 rotates about steering post reinforcement 20 to move the steering device 72 away from the occupant of the three-wheeled vehicle 10. As the steering post 18 is moved vehicle-rearward, the steering post 18 contacts the curved portion 26 of the steering post reinforcement 20. As the steering post 18 contacts the steering post reinforcement 20, the top portion rotates away from the occupant, e.g., the seat 50, of the three-wheeled vehicle 10. In other words, the steering post 18 may nest in the curved portion 26 to move the steering device 72 away from the occupant.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a vehicle frame including a first post and a second post spaced cross-vehicle from the first post;
   a steering post rotatably supported by the vehicle frame, the steering post extending along an axis between the first post and the second post;
   a steering post reinforcement having a first end and a second end each fixed to the vehicle frame and a curved portion curving about the axis between the first end and the second end;
   the steering post reinforcement including a first portion extending from the first end to the curved portion and a second portion extending from the second end to the curved portion;
   the first portion and the second portion being elongated from the vehicle frame to the curved portion in a vehicle-rearward direction of the vehicle frame;
   the curved portion defining an opening between the curved portion and the vehicle frame and between the first end and the second end;
   the steering post extending through the opening between the curved portion and the vehicle frame and between the first portion and the second portion; and
   the curved portion being spaced from the steering post in the vehicle-rearward direction and the first portion and the second portion being spaced from the steering post in a cross-vehicle direction.

2. The vehicle of claim 1, further comprising:
   a pair of body sides each supported by the first post and the second post, the body sides extending in the vehicle-rearward direction from each of the first post and the second post; and wherein:
   the curved portion is spaced equidistantly from each of the body sides.

3. The vehicle of claim 1, wherein the steering post reinforcement is continuous from the first end to the second end.

4. The vehicle of claim 1, wherein the first portion and the second portion are elongated along a vehicle-longitudinal axis.

5. The vehicle of claim 1, further comprising a seat spaced from the steering post in the vehicle-rearward direction, the curved position being between the steering post and the seat.

6. The vehicle of claim 5, wherein the seat defines an occupant seating area, the curved portion being between the steering post and the occupant seating area.

7. The vehicle of claim 1, wherein the steering post reinforcement extends vehicle-rearward of the first post and the second post.

8. The vehicle of claim 1, wherein the vehicle frame includes a crossbeam extending from the first post to the second post, the first end and the second end being fixed to the crossbeam.

9. The vehicle of claim 8, wherein the opening is vehicle-rearward of the crossbeam and the opening extends from the curved portion to the crossbeam.

10. The vehicle of claim 8, wherein the steering post is between the crossbeam and the curved portion.

11. The vehicle of claim 8, wherein the steering post reinforcement is fixed to the crossbeam at a position equidistant from the first post and the second post.

12. The vehicle of claim 8, wherein the first portion and the second portion are elongated in the vehicle-rearward direction from the crossbeam to the curved portion.

13. The vehicle of claim 12, wherein the first portion and the second portion are parallel to each other from the crossbeam to the curved portion.

14. The vehicle of claim 8, wherein at least a portion of the steering post is vehicle-rearward of the crossbeam at the steering post reinforcement.

15. The vehicle of claim 8, wherein the steering post is spaced from the crossbeam.

16. The vehicle of claim 1, wherein the steering post reinforcement extends from the first post to the second post, the first end being fixed to the first post and the second end being fixed to the second post.

17. The vehicle of claim 1, further comprising a wheel spaced vehicle-forward of the vehicle frame and coupled to the steering post, the wheel being aligned in the cross-vehicle direction with the steering post reinforcement.

18. The vehicle of claim 17, wherein the vehicle frame includes a frame member supporting the steering post between the first post and the second post, the frame member supporting the steering post between the steering post reinforcement and the wheel along the axis.

19. The vehicle of claim 18, wherein the steering post reinforcement is spaced upwardly from the frame member.

20. The vehicle of claim 18, further comprising a steering device supported by the steering post, the steering post reinforcement being between the frame member and the steering device.

\* \* \* \* \*